(12) United States Patent
Kikuchi

(10) Patent No.: US 12,537,126 B2
(45) Date of Patent: Jan. 27, 2026

(54) INDUCTOR COMPONENT

(71) Applicant: Murata Manufacturing Co., Ltd., Kyoto-fu (JP)

(72) Inventor: Seiya Kikuchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1002 days.

(21) Appl. No.: 17/685,217

(22) Filed: Mar. 2, 2022

(65) Prior Publication Data

US 2022/0310304 A1 Sep. 29, 2022

(30) Foreign Application Priority Data

Mar. 29, 2021 (JP) .................. 2021-055792

(51) Int. Cl.
*H01F 27/28* (2006.01)
*H01F 27/29* (2006.01)

(52) U.S. Cl.
CPC ....... *H01F 27/2804* (2013.01); *H01F 27/292* (2013.01); *H01F 2027/2809* (2013.01)

(58) Field of Classification Search
CPC ............... H01F 27/2804; H01F 27/292; H01F 2027/2809; H01F 17/0013; H01F 17/0033; H01F 2017/004
USPC ........................................ 336/200, 232, 192
See application file for complete search history.

(56) References Cited

U.S. PATENT DOCUMENTS

2018/0061552 A1* 3/2018 Yang .................... H01F 17/0013
2019/0355508 A1* 11/2019 Lim ..................... H01F 17/0013

FOREIGN PATENT DOCUMENTS

| CN | 106098295 A | 11/2016 |
|---|---|---|
| CN | 112309672 A | 2/2021 |
| JP | H04-065807 A | 3/1992 |
| JP | 2005-38904 A | 2/2005 |
| JP | 2005-294725 A | 10/2005 |
| JP | 2006-303209 A | 11/2006 |
| JP | 2010-192889 A | 9/2010 |
| JP | 2013-118396 A | 6/2013 |
| JP | 2014-024735 A | 2/2014 |
| JP | 2014-078650 A | 5/2014 |
| JP | 2014-107513 A | 6/2014 |
| JP | 2016-207939 A | 12/2016 |
| JP | 2017-63100 A | 3/2017 |
| JP | 2019-514196 A | 5/2019 |
| JP | 2021-027080 A | 2/2021 |

* cited by examiner

*Primary Examiner* — Shawki S Ismail
*Assistant Examiner* — Kazi S Hossain
(74) *Attorney, Agent, or Firm* — Studebaker Brackett PLLC

(57) ABSTRACT

An inductor component comprising an element body; and a coil disposed in the element body and wound along an axial direction. The element body includes a void which exists at least in a region within 10 μm from the coil.

18 Claims, 6 Drawing Sheets

INDUCTOR COMPONENT

CROSS REFERENCE TO RELATED APPLICATION

This application claims benefit of priority to Japanese Patent Application 2021-055792, filed Mar. 29, 2021, the entire content of which is incorporated herein by reference.

BACKGROUND

Technical Field

The present disclosure relates to an inductor component.

Background Art

A conventional inductor component is described in Japanese Laid-Open Patent Publication No. 2014-107513. This inductor component includes an element body and a coil disposed in the element body and wound along an axial direction. The element body is made of glass etc.

SUMMARY

In the conventional inductor component, the relative permittivity of the element body is high, and a high self-resonant frequency (SRF) may not be obtained.

Therefore, the present disclosure is to provide an inductor component capable of increasing SRF.

An aspect of the present disclosure provides an inductor component comprising an element body; and a coil disposed in the element body and wound along an axial direction. The element body includes a void, and the void exists at least in a region within 10 μm from the coil.

According to the embodiment, since the element body includes the voids, the relative permittivity of the element body is lowered and SRF can be made higher.

Preferably, in an embodiment of the inductor component, a size of the void in the axial direction is 0.1 μm or more and 20 μm or less (i.e., from 0.1 μm to 20 μm).

The "size of the void in the axial direction" is a value measured in a cross section including the axis of the coil.

According to the embodiment, SRF can be made higher while ensuring the strength of the element body.

Preferably, in an embodiment of the inductor component, a size of the void in the axial direction is 0.1 μm or more and 10 μm or less (i.e., from 0.1 μm to 10 μm).

According to the embodiment, the strength of the element body can further be improved.

Preferably, in an embodiment of the inductor component, the void is one of a plurality of voids, and the plurality of voids is separated from each other at a distance of 0.1 μm or more.

According to the embodiment, since the plurality of voids is dispersed in the element body, when the element body receives an impact, the impact can be mitigated in the entire element body.

Preferably, in an embodiment of the inductor component, the coil has a plurality of coil wirings wound along a plane orthogonal to the axial direction. The plurality of the coil wirings is arranged side by side in the axial direction and electrically connected to each other, and the void exists at least in a region between the coil wirings adjacent to each other in the axial direction.

The "region between the coil wirings adjacent to each other in the axial direction" is a region between the adjacent coil wirings and surrounded by a first surface connecting an inner circumferential surface of one coil wiring and an inner circumferential surface of the other coil wiring and a second surface connecting an outer circumferential surface of the one coil wiring and an outer circumferential surface of the other coil wiring.

According to the embodiment, since the void is disposed in a place where stray capacitance is likely to occur, SRF can further be increased.

Preferably, in an embodiment of the inductor component, in the cross section including the axis of the coil, a first area ratio of an area of the voids in a region between the coil wirings adjacent to each other in the axial direction in all the coil wirings to the area of an element body is larger than a second area ratio of an area of the voids in a region on the axis side of the coil relative to an inner circumferential surface of the coil to the area of the element body.

According to the embodiment, since the relatively more voids are present in the place where the stray capacitance is likely to occur and the relatively less voids are present in the place where the influence on the stray capacitance is small, the strength of the element body can more effectively be ensured, and SRF can be made higher.

Preferably, in an embodiment of the inductor component, the first area ratio is 5/95 or more and 50/50 or less (i.e., from 5/95 to 50/50), and the second area ratio is 0 or more and 1/99 or less (i.e., from 0 to 1/99).

According to the embodiment, the strength of the element body can more effectively be ensured and SRF can be made higher.

Preferably, in an embodiment of the inductor component, the inductor component further comprises an external electrode exposed from the surface of the element body. The external electrode is electrically connected to the coil. The coil includes a plurality of coil wirings wound along a plane orthogonal to the axial direction. The plurality of the coil wirings is arranged side by side in the axial direction and are electrically connected to each other, and the void exists at least in a region where the coil wiring and the external electrode overlap when viewed in a direction orthogonal to the surface of the element body provided with the external electrode.

According to the embodiment, since the void is disposed in a place where stray capacitance is likely to occur, SRF can further be increased.

Preferably, in an embodiment of the inductor component, in a cross section parallel to the axis of the coil and orthogonal to the surface of the element body disposed with the external electrode, a third area ratio of an area of the voids in a region where the coil wiring and the external electrode overlap when viewed in a direction orthogonal to the surface of the element body to the area of the element body is larger than a second area ratio of an area of the voids in a region on the axis side of the coil relative to an inner circumferential surface of the coil to the area of the element body.

According to the embodiment, since the relatively more voids are present in the place where the stray capacitance is likely to occur and the relatively less voids are present in the place where the influence on the stray capacitance is small, the strength of the element body can more effectively be ensured, and SRF can be made higher.

Preferably, in an embodiment of the inductor component, the third area ratio is 5/95 or more and 50/50 or less (i.e., from 5/95 to 50/50), and the second area ratio is 0 or more and 1/99 or less (i.e., from 0 to 1/99).

According to the embodiment, the strength of the element body can more effectively be ensured and SRF can be made higher.

Preferably, in an embodiment of the inductor component, the void exists at least in a region on a side opposite to the axis of the coil relative to an outer circumferential surface of the coil.

According to the embodiment, when the element body receives an impact, the impact can be dispersed and mitigated.

Preferably, in an embodiment of the inductor component, in a cross section including the axis of the coil, a fourth area ratio of an area of the voids in a region on the side opposite to the axis of the coil relative to the outer circumferential surface of the coil to an area of the element body is larger than a second area ratio of an area of the voids in a region on the axis side of the coil relative to an inner circumferential surface of the coil to the area of the element body.

According to the embodiment, the strength of the element body can be ensured, and when the element body receives an impact, the impact can be mitigated.

Preferably, in an embodiment of the inductor component, a relative permittivity of the element body is 2.0 or more and 8.0 or less (i.e. from 2.0 to 8.0).

According to the embodiment, SRF can further be increased.

Preferably, in an embodiment of the inductor component, the coil is exposed to the void.

According to the embodiment, SRF can further be increased.

According to the inductor component of an aspect of the present disclosure, SRF can be made higher.

DETAILED DESCRIPTION

An inductor component of an aspect of the present disclosure will now be described in detail with reference to shown embodiments. The drawings include schematics and may not reflect actual dimensions or ratios.

First Embodiment

Figure 1:
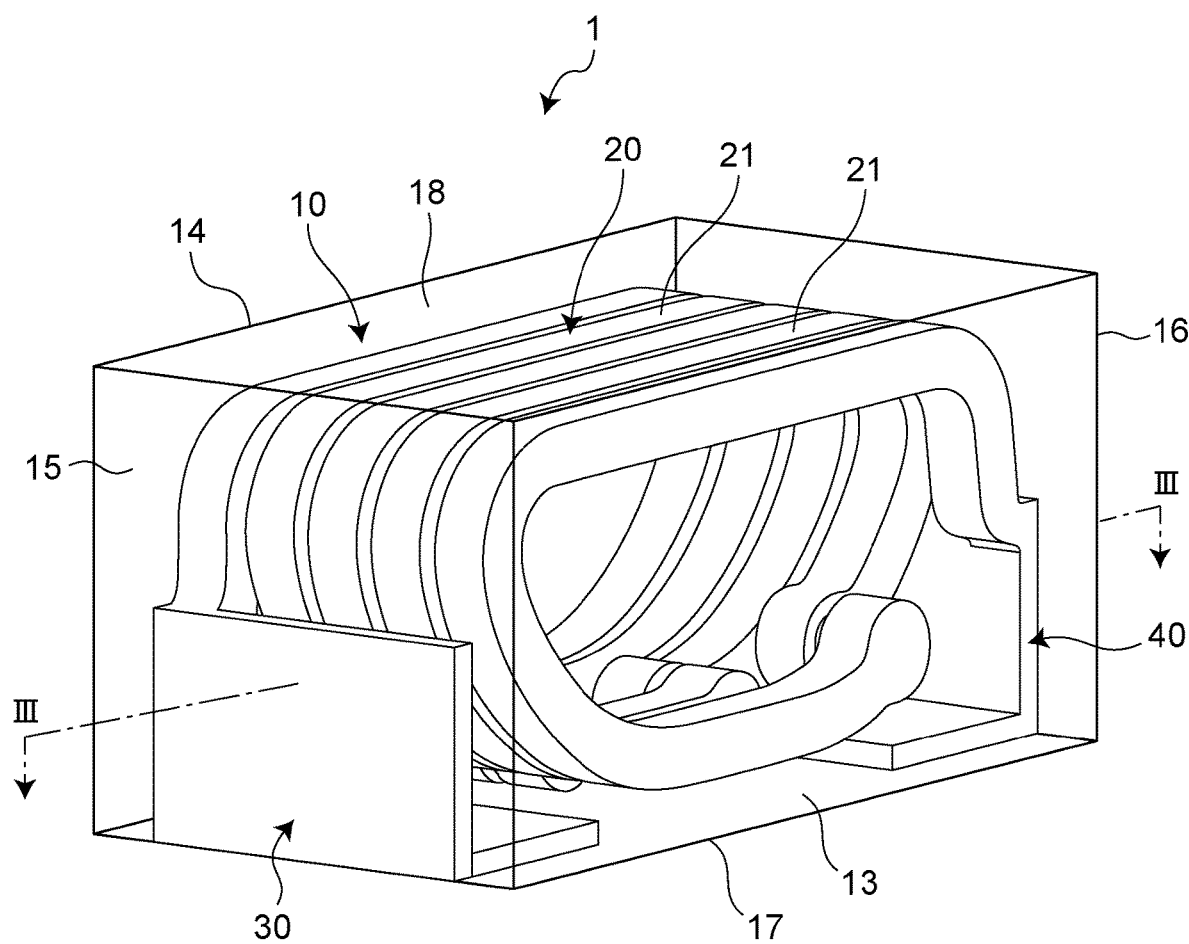
FIG. 1 is a transparent perspective view showing a first embodiment of an inductor component.
Figure 2:
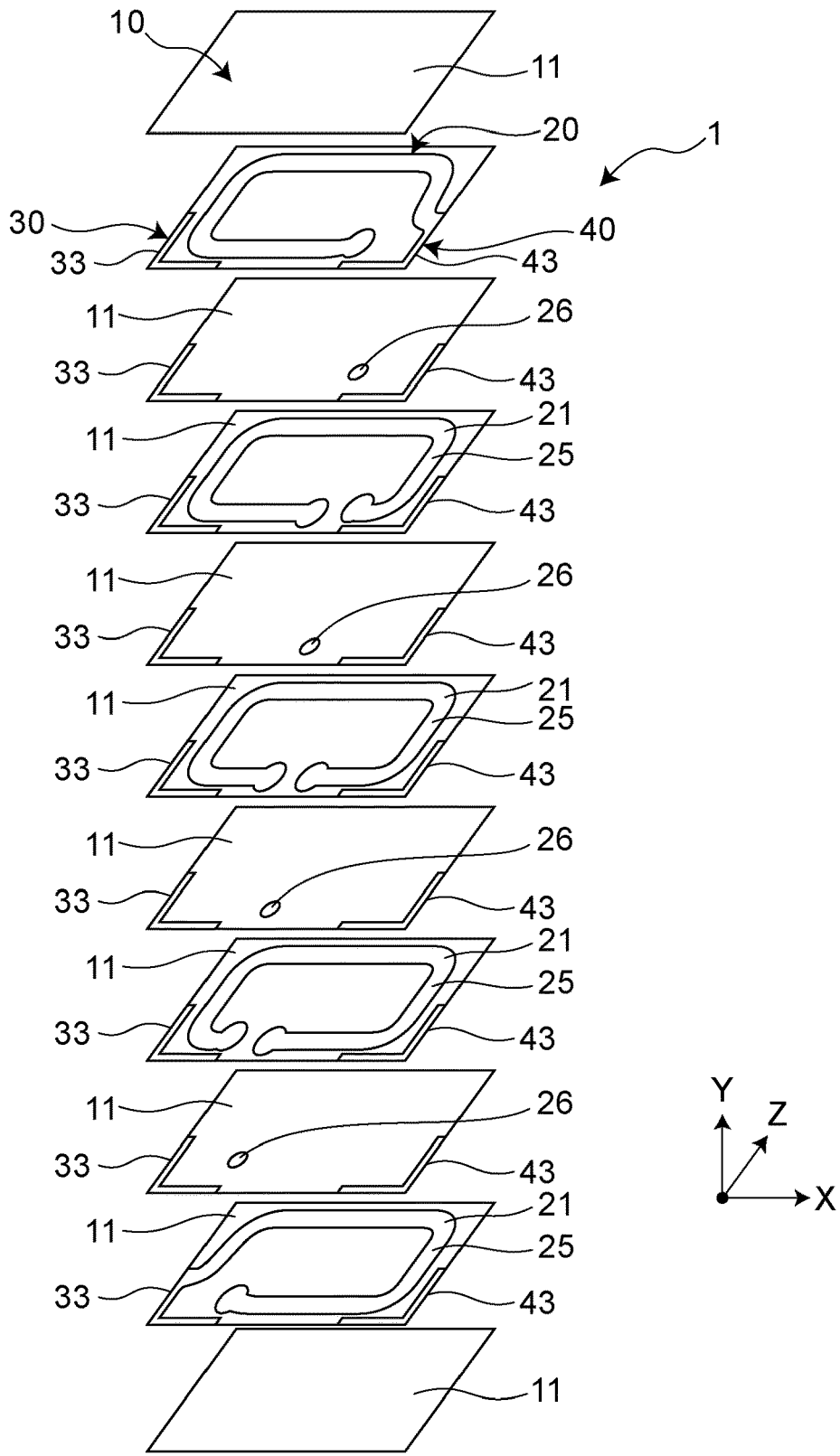
FIG. 2 is an exploded perspective view of the inductor component.

FIG. 1 is a transparent perspective view showing a first embodiment of an inductor component. FIG. 2 is an exploded perspective view of the inductor component. As shown in FIGS. 1 and 2, an inductor component 1 has an element body 10, a coil 20 disposed inside the element body 10 and helically wound along an axis, and a first external electrode 30 and a second external electrode 40 disposed on the element body 10 and electrically connected to the coil 20. In FIG. 1, the element body 10 is transparently drawn so that a structure can easily be understood; however, the element body may be semitransparent or opaque.

The inductor component 1 is electrically connected via the first and second external electrodes 30, 40 to a wiring of a circuit board not shown. The inductor component 1 is used as an impedance matching coil (matching coil) of a high-frequency circuit, for example, and is used for an electronic device such as a personal computer, a DVD player, a digital camera, a TV, a portable telephone, automotive electronics, and medical/industrial machinery. However, the inductor component 1 is not limited to these uses and is also usable for a tuning circuit, a filter circuit, and a rectifying/smoothing circuit, for example.

The element body 10 is formed into a substantially rectangular parallelepiped shape. The surface of the element body 10 includes a first end surface 15 and a second end surface 16 opposite to each other, a first side surface 13 and a second side surface 14 opposite to each other, a bottom surface 17 connected between the first end surface 15 and the second end surface 16 and between the first side surface 13 and the second side surface 14, and a top surface 18 opposite to the bottom surface 17. As shown in the figures, an X direction is a direction orthogonal to the first end surface 15 and the second end surface 16; a Y direction is a direction orthogonal to the first side surface 13 and the second side surface 14; and a Z direction is a direction orthogonal to the bottom surface 17 and the top surface 18 and is a direction orthogonal to the X direction and the Y direction.

The element body 10 is formed by laminating multiple insulating layers 11. The insulating layers 11 are made of, for example, a material mainly composed of borosilicate glass, a ferrite, a resin, etc. The lamination direction of the insulating layer 11 is a direction parallel to the first and second end surfaces 15, 16 and the bottom surface 17 of the element body 10 (Y direction). Therefore, the insulating layers have a layer shape extending in an X-Z plane. As used herein, the term "parallel" refers not only to a strictly parallel relationship but also to a substantially parallel relationship in consideration of a realistic variation range. In the element body 10, an interface between the multiple insulating layers 11 may not be clear due to firing etc.

The first external electrode 30 and the second external electrode 40 are made of a conductive material such as Ag, Cu, Au, and an alloy mainly composed thereof, for example. The first external electrode 30 has an L-shape formed from the first end surface 15 to the bottom surface 17. The first external electrode 30 is embedded in the element body 10 so as to be exposed from the first end surface 15 and the bottom surface 17. The second external electrode 40 has an L-shape formed from the second end surface 16 to the bottom surface 17. The second external electrode 40 is embedded in the element body 10 so as to be exposed from the second end surface 16 and the bottom surface 17.

The first external electrode 30 and the second external electrode 40 have a configuration in which multiple first external electrode conductor layers 33 and second external electrode conductor layers 43 embedded in the element body 10 (the insulating layer 11) are laminated. The first external electrode conductor layers 33 extend along the first end surface 15 and the bottom surface 17, and the second external electrode conductor layers 43 extend along the second end surface 16 and the bottom surface 17. As a result, the external electrodes 30, 40 can be embedded in the element body 10, so that the inductor component can be reduced in size as compared to the configuration in which the external electrodes are externally attached to the element body 10. Additionally, the coil 20 and the external electrodes 30, 40 can be formed in the same steps, so that variations in the positional relationship between the coil 20 and the first and second external electrodes 30, 40 can be reduced to decrease variations in electrical characteristics of the inductor component 1.

The coil 20 is made of, for example, the same conductive material as the first and second external electrodes 30, 40. The coil 20 is helically wound along the lamination direction of the insulating layer 11. A first end of the coil 20 is connected to the first external electrode 30, and a second end of the coil 20 is connected to the second external electrode 40. In this embodiment, the coil 20 and the first and second external electrodes 30, 40 are integrated without a clear boundary; however, this is not a limitation, and the coil and the external electrodes may be made of different materials or by different construction methods so that boundaries may exist.

Although the coil 20 is formed in a substantially rectangular shape when viewed in the axial direction, the present disclosure is not limited to this shape. The shape of the coil 20 may be circular, elliptical, rectangular, or other polygonal shapes, for example. The coil 20 is wound along the axial direction so that the axial direction is parallel to the bottom surface 17 and intersects with the first side surface 13 and the second side surface 14. The axis of the coil 20 coincides with the lamination direction (Y direction) of the insulating layers 11. The axis of the coil 20 means the central axis of the helical shape of the coil 20.

The coil 20 has multiple coil wirings 21 laminated along the axial direction, and via wirings 26 extending along the axial direction and connecting the coil wirings 21 adjacent to each other in the axial direction. The multiple coil wirings 21 are each wound along a plane, arranged side by side in the axial direction, and electrically connected in series to form a helix. The coil wiring 21 is made up of one coil conductor layer 25. The coil wiring 21 may be made up of multiple coil conductor layers 25.

The coil wiring 21 is formed by being wound on a principal surface (X-Z plane) of the insulating layer 11 orthogonal to the axial direction. The number of turns of the coil wiring 21 is less than one or may be one or more. The via wirings 26 penetrate the insulating layer 11 in the thickness direction (Y direction). The coil wirings 21 adjacent to each other in the lamination direction are electrically connected in series via the via wirings 26.

Figure 3:
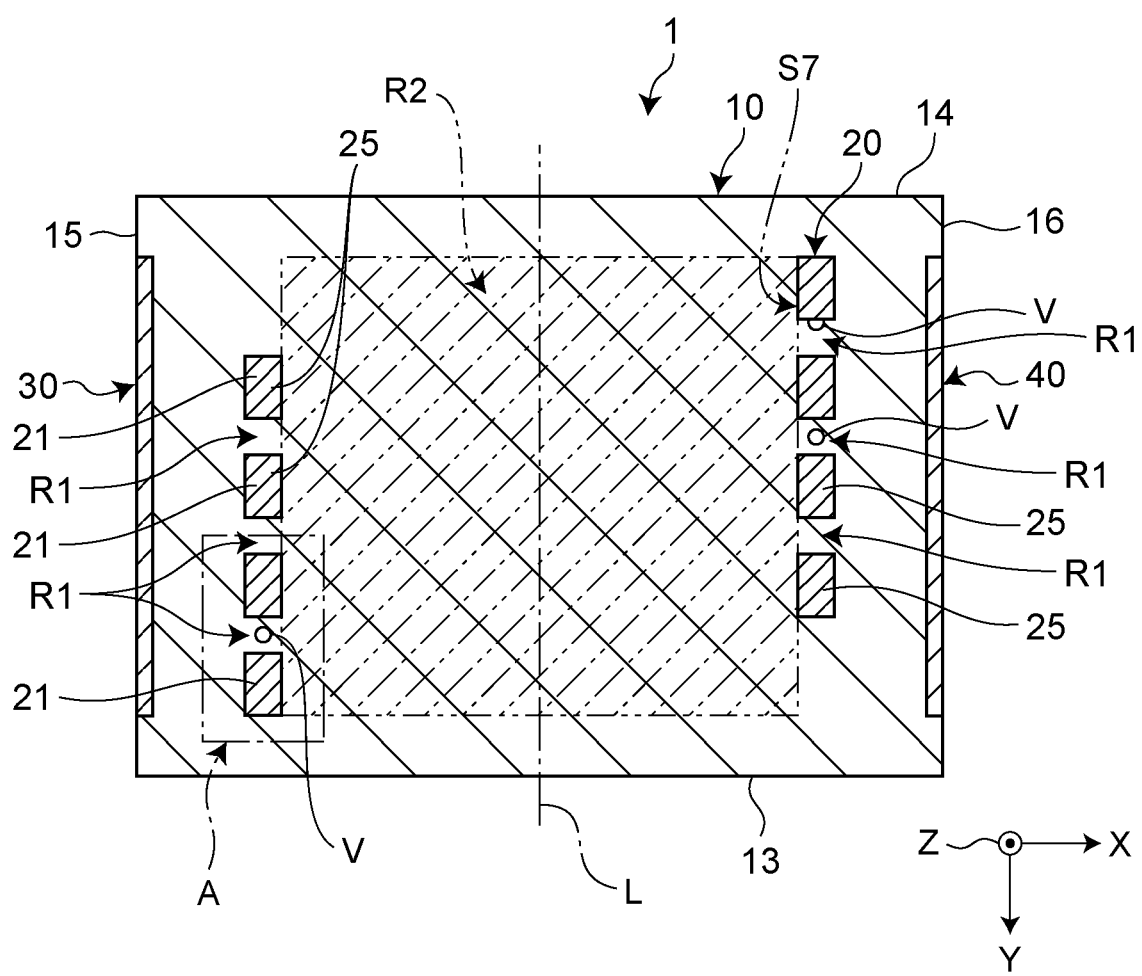
FIG. 3 is a cross-sectional view taken along a line III-III of FIG. 1.

FIG. 3 is a cross-sectional view taken along a line III-III of FIG. 1. FIG. 3 shows a cross section including an axis L of the coil 20 and the cross section is parallel to the X-Y plane. As shown in FIG. 3, the element body 10 includes a void V. The void V exists at least in a region within 10 µm from the coil 20. Specifically, the void V exists in a region within 10 µm from at least the coil wiring 21 between the coil wiring 21 and the via wiring 26. The void V is preferably present in a region within 10 µm from each of the coil wiring 21 and the via wiring 26.

The void V has a circular cross-sectional shape in FIG. 3 or may have various shapes such as an ellipse and a polygon. When the cross-sectional shape is elliptical, the void V may extend along the axial direction or may extend in a direction orthogonal to the axial direction. The void V may have a shape acquired by connecting multiple circles, ellipses, polygons, etc. In a method of determining the void V, when the element body 10 is made of glass, for example, a portion appearing black due to light applied (from the outer circumference) by ring lighting may be determined as the void in observation with SEM.

The formation of the void V can be controlled by a method of manufacturing the inductor component 1. For example, referring to FIGS. 2 and 3, in the method of manufacturing the inductor component 1, when the coil wiring 21 (the coil conductor layer 25) is laminated on the insulating layer 11, a compound decomposing at a desired firing temperature is added to a predetermined position of the coil wiring 21 (coil conductor layer 25) so as to dispose the void V at a desired position in the element body 10. Subsequently, the compound is decomposed at the time of firing, and the void V can be formed at the desired position in the element body 10. In another method, the compound may be added to a predetermined position of the insulating layer 11. The present disclosure is not limited to the manufacturing method described above, and other manufacturing methods may be adopted as long as the void V is formed.

According to this embodiment, since the void V is disposed in the element body 10, the relative permittivity of the element body 10 is lowered and SRF can be increased. Specifically, SRF($f_0$) can be obtained by Eqs. 1 and 2.

$$f_0 = 1/2\pi\sqrt{LC} \quad \text{[Equation 1]}$$

$$C = \frac{\varepsilon_0 \varepsilon_r S}{l} \quad \text{[Equation 2]}$$

where
$f_0$: self-resonant frequency (Hz)
L: inductance (H)
C: capacitance (F)
$\varepsilon_0$: vacuum permittivity (F/m)
$\varepsilon_r$: relative permittivity
l: distance between electrodes (m)
S: electrode area ($m^2$)

The relative permittivity of the void V is about 1.0, which is lower than the relative permittivity of the material constituting the element body 10 such as borosilicate glass. Therefore, the relative permittivity of the element body 10 including the void V is lower than the relative permittivity of the conventional element body not including the void V. As a result, the capacity C of Eq. 2 is reduced, and SRF can be made higher.

Preferably, a size of the void V in the axial direction (Y direction) is 0.1 µm or more and 20 µm or less (i.e., from 0.1 µm to 20 µm). The "size of the void V in the axial direction" may be measured in a cross section including the axis of the coil and parallel to the X-Y plane, for example. A size of the void V in a direction orthogonal to the axial direction is not particularly limited.

According to the configuration described above, since the size of the void V in the axial direction is 0.1 µm or more, SRF can be made higher. Since the size of the void V in the axial direction is 20 µm or less, the strength of the element body 10 can be ensured.

Preferably, a size of the void V in the axial direction is 0.1 µm or more and 10 µm or less (i.e., from 0.1 µm to 10 µm).

According to the configuration described above, since the size of the void V in the axial direction is 0.1 µm or more, SRF can be made higher. Since the size of the void V in the axial direction is 10 µm or less, the strength of the element body 10 can more reliably be ensured.

Preferably, multiple voids V exist, and the multiple voids V are separated from each other at a distance of 0.1 µm or more.

According to the configuration described above, since the multiple voids V are dispersed in the element body 10, when the element body 10 receives an impact, the impact can be mitigated by the entire element body 10.

Figure 4:
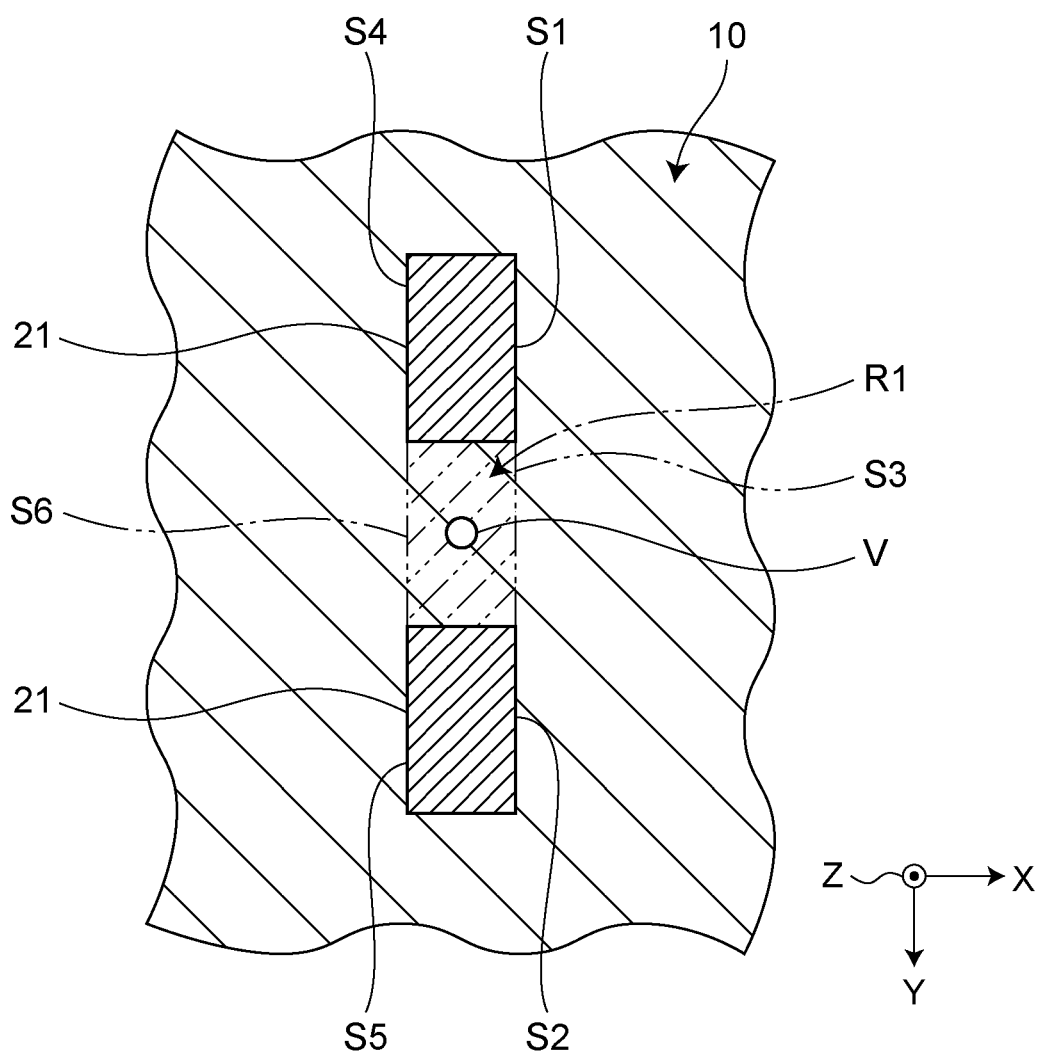
FIG. 4 is an enlarged view of a region A of FIG. 3.

Preferably, the void V is at least present in a region between the coil wirings 21 adjacent to each other in the axial direction. This will hereinafter be described in detail. FIG. 4 is an enlarged view of a region A in FIG. 3. As shown in FIG. 4, the "region between the coil wirings 21 adjacent to each other in the axial direction" is a region R1 between the adjacent coil wirings 21 and surrounded by a first surface S3 connecting an inner circumferential surface S1 of the one coil wiring 21 and an inner circumferential surface S2 of the other coil wiring 21 and a second surface S6 connecting an outer circumferential surface S4 of the one coil wiring 21 and an outer circumferential surface S5 of the other coil wiring 21. The inner circumferential surfaces S1, S2 of the coil wirings 21 are surfaces on the axis L side of the coil wirings S1. In other words, the surfaces are the radially inner surfaces of the coil wirings 21. The inner circumferential surfaces S1, S2 of the coil wirings 21 form a portion of the inner circumferential surface of the coil 20. The outer circumferential surfaces S4, S5 of the coil wirings 21 are surfaces on the side opposite to the axis L in the coil wirings 21. In other words, the surfaces are the radially outer surfaces of the coil wirings 21. The outer circumferential surfaces S4, S5 of the coil wirings 21 form a portion of the outer circumferential surface of the coil 20.

According to the configuration described above, since the void V is disposed in a place where stray capacitance is likely to occur, SRF can further be increased.

Preferably, as shown in FIG. 3, in the cross section including the axis of the coil 20, a first area ratio (the area of the voids V/the area of the element body) of the area of the voids V in the region R1 between the coil wirings 21 adjacent to each other in the axial direction in all the coil wirings 21 to the area of the element body (excluding the voids V) is larger than a second area ratio (the area of the voids V/the area of the element body) of the area of the voids V in the region R2 on the axis L side of the coil 20 relative to the inner circumferential surface S7 of the coil 20 to the area of the element body (excluding the voids V). The "cross section including the axis of the coil 20" may be a cross section including the axis of the coil 20 and parallel to the X-Y plane as shown in FIG. 3. The "inner circumferential surface S7 of the coil 20" is a surface acquired by connecting the inner circumferential surfaces of all the coil wirings 21.

According to the configuration described above, since the relatively more voids V are present in the place where the stray capacitance is likely to occur and the relatively less voids V are present in the place where the influence on the stray capacitance is small, the strength of the element body 10 can more effectively be ensured, and SRF can be made higher.

Preferably, the first area ratio is 5/95 or more and 50/50 or less (i.e., from 5/95 to 50/50), and the second area ratio is 0 or more and 1/99 or less (i.e., from 0 to 1/99).

According to the configuration described above, the strength of the element body 10 can more effectively be ensured and SRF can be made higher.

Preferably, the relative permittivity of the element body 10 is 2.0 or more and 8.0 or less (i.e., from 2.0 to 8.0).

According to the configuration described above, the relative permittivity is lowered and SRF can be made higher.

Preferably, the coil 20 is exposed to the void V as with the void V closest to the second side surface 14 shown in FIG. 3.

According to the configuration described above, SRF can be further be increased. The void V may not be in contact with the coil 20 as with the other voids V shown in FIG. 3. According to this configuration, even if water or gas permeates the void V from the outside, the influence of the water or gas on the coil 20 can be reduced.

Preferably, in the cross section including the axis of the coil 20, the area ratio to the area of the voids having an axial size of less than 0.1 µm to the area of the element body 10 is 1.0% or less.

According to the configuration described above, the denseness of the element body 10 can be ensured, so that the strength of the element body 10 can be ensured.

Second Embodiment

Figure 5:
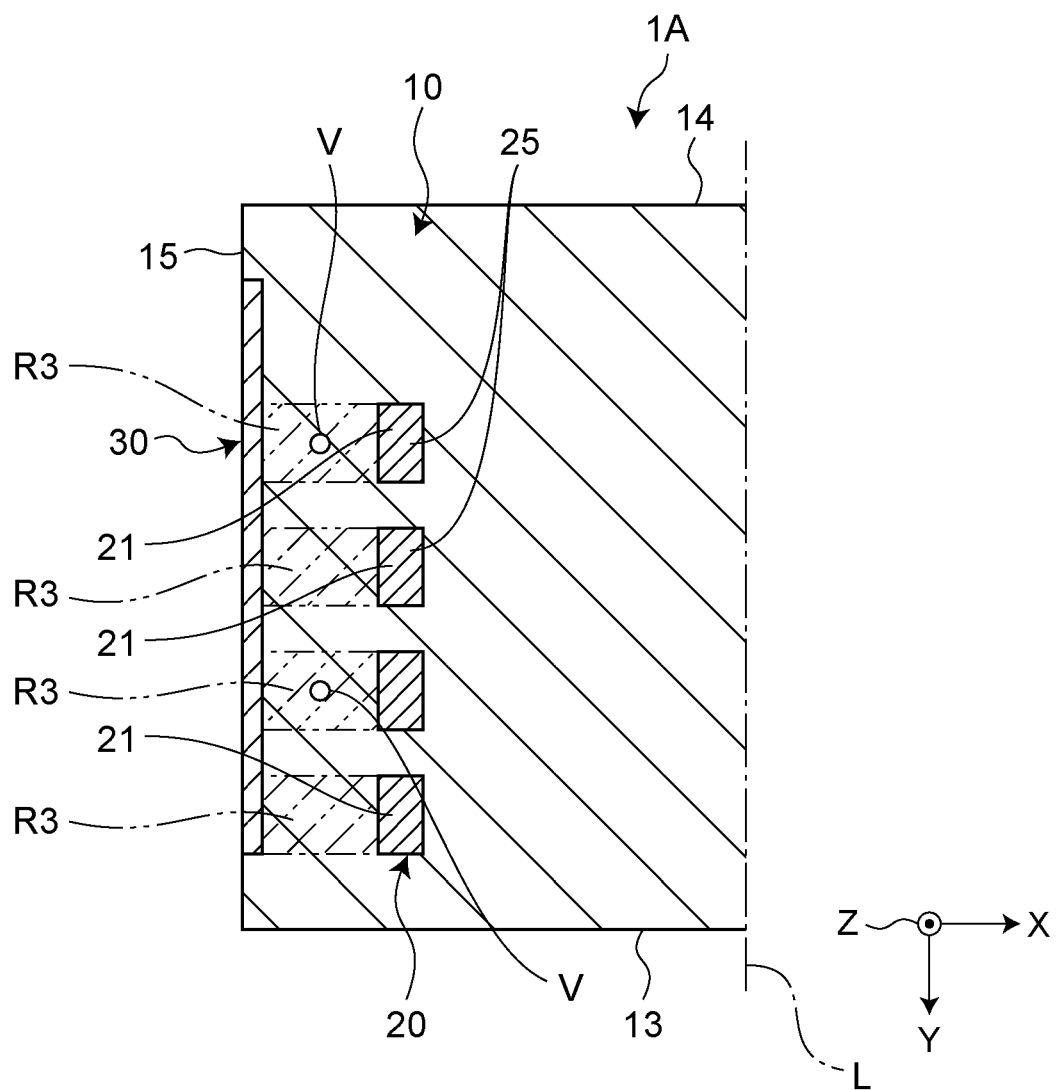
FIG. 5 is a cross-sectional view showing a second embodiment of the inductor component.

FIG. 5 is a cross-sectional view showing a second embodiment of the inductor component. FIG. 5 shows a cross section including the axis L of the coil 20 and intersecting with the first external electrode 30, and in this embodiment, the cross section is parallel to the X-Y plane. FIG. 5 shows only a portion on the first end surface 15 side from the axis L of the coil 20 for convenience. The second embodiment is different from the first embodiment in the place where the voids exist. This different configuration will hereinafter be described. The other constituent elements have the same configuration as the first embodiment and are denoted by the same reference numerals as the first embodiment and will not be described.

As shown in FIG. 5, the void V exists at least in a region R3 where the coil wiring 21 and the first external electrode 30 overlap when viewed in a direction orthogonal to the surface of the element body 10 disposed with the first external electrode 30. In this embodiment, the "surface of the element body 10 disposed with the first external electrode 30" is the first end surface 15. Since the first external electrode 30 is also embedded in the bottom surface 17, the void V may be present in the region R3 where the coil wiring 21 and the first external electrode 30 overlap when viewed in a direction orthogonal to the bottom surface 17. When the first external electrode 30 is an L-shaped electrode as in this embodiment, the void V may be present in the region R3 where the coil wiring 21 and the first external electrode 30 overlap when viewed in a direction orthogonal to at least one of the first end surface 15 and the bottom surface 17. The same applies to the second external electrode 40. Although FIG. 5 shows a cross section including the axis L of the coil 20, the cross section having the void V according to this embodiment may not include the axis L of the coil 20. Therefore, the cross section having the void V according to this embodiment may be a cross section that is parallel to the axis L of the coil 20 and orthogonal to the surface of the element body 10 disposed with the first external electrode 30 and/or the surface of the element body 10 disposed with the second external electrode 40 and that intersects with the coil wiring 21 and the first external electrode 30 and/or the second external electrode 40.

According to this embodiment, since the void V is disposed in a place where stray capacitance is likely to occur, SRF can be made higher.

Preferably, in a cross section parallel to the axis L of the coil 20 and orthogonal to the surface of the element body 10 disposed with the first external electrode 30 and/or the surface of the element body 10 disposed with the second external electrode 40, a third area ratio (the area of the voids V/the area of the element body) of the area of the voids V in the region R3 where the coil wiring 21 and the first external electrode 30 overlap when viewed in a direction orthogonal to the surface of the element body 10 to the area of the element body (excluding the voids V) is larger than the second area ratio (the area of the voids V/the area of the element body) of the area of the voids V in the region on the axis L side of the coil relative to the inner circumferential surface of the coil to the area of the element body.

The "cross section parallel to the axis L of the coil 20 and orthogonal to the surface of the element body 10 disposed with the first external electrode 30 and/or the surface of the element body 10 disposed with the second external electrode 40" may be a cross section including the axis L of the coil, intersecting with the external electrodes 30, 40, and parallel to the X-Y plane as shown FIG. 5. When the cross section does not intersect with the external electrodes 30, 40, a cross section parallel to the X-Y plane and intersecting with the external electrodes 30, 40 may be observed. The second area ratio may be calculated in the cross section shown in FIG. 5 by the same method as in the first embodiment.

According to the configuration described above, since the relatively more voids V are present in the place where the stray capacitance is likely to occur and the relatively less voids V are present in the place where the influence on the stray capacitance is small, the strength of the element body 10 can more effectively be ensured, and SRF can be made higher.

Preferably, the third area ratio is 5/95 or more and 50/50 or less (i.e., from 5/95 to 50/50), and the second area ratio is 0 or more and 1/99 or less (i.e., from 0 to 1/99).

According to the configuration described above, the strength of the element body 10 can more effectively be ensured and SRF can be increased.

Preferably, the void V is not in contact with the coil 20 or the external electrodes 30, 40 as with the voids V shown in FIG. 5.

According to the configuration described above, even if water or gas permeates the void V from the outside, the influence of the water or gas on the coil 20 or the external electrodes 30, 40 can be reduced. The coil 20 and the external electrodes 30, 40 may be exposed to the void V.

Third Embodiment

Figure 6:
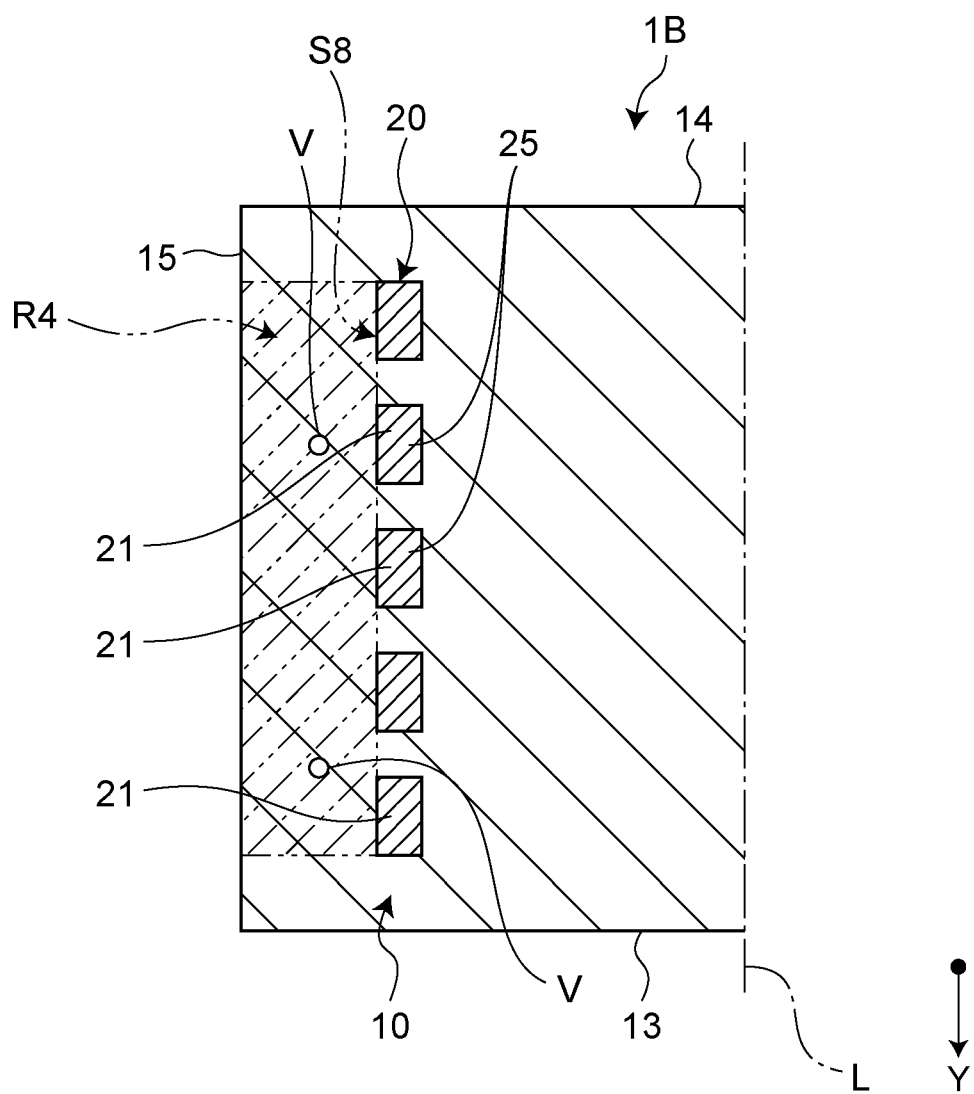
FIG. 6 is a cross-sectional view showing a third embodiment of the inductor component.

FIG. 6 is a cross-sectional view showing a third embodiment of the inductor component. FIG. 6 shows a cross section including the axis L of the coil 20 and not intersecting with the first external electrode 30. FIG. 6 shows only a portion on the first end surface 15 side relative to the axis L of the coil 20 for convenience. The third embodiment is different from the first embodiment in the place where the voids exist. This different configuration will hereinafter be described. The other constituent elements have the same configuration as the first embodiment and are denoted by the same reference numerals as the first embodiment and will not be described.

As shown in FIG. 6, the void V exists at least in a region R4 on the side opposite to the axis L of the coil 20 relative to an outer circumferential surface S8 of the coil 20. The "outer circumferential surface S8 of the coil 20" is a surface acquired by connecting the outer circumferential surfaces of all the coil wirings 21. Although FIG. 6 shows an example in a cross section including the axis L of the coil 20 and not intersecting with the first external electrode 30, the void V may exist in the region R4 on the side opposite to the axis L of the coil 20 relative to the outer circumferential surface S8 of the coil 20 in a cross section including the axis L of the coil 20 and intersecting with the first external electrode 30 as shown in FIG. 5.

According to this embodiment, since the void V exists in the region on the side opposite to the axis L of the coil 20 relative to the outer circumferential surface of the coil 20, when the element body 10 receives an impact, the impact can be dispersed and mitigated.

Preferably, in the cross section including the axis L of the coil 20, a fourth area ratio (the area of the voids V/the area of the element body) of the area of the voids V in the region R4 on the side opposite to the axis L of the coil 20 relative to the outer circumferential surface S8 of the coil 20 to the area of the element body (excluding the voids V) is larger than the second area ratio of the area of the voids V in the region on the axis L side of the coil 20 relative to the inner circumferential surface of the coil 20 to the area of the element body (excluding the voids V). The second area ratio may be calculated in the cross section shown in FIG. 6 by the same method as in the first embodiment.

According to the configuration described above, the strength of the element body 10 can be ensured, and when the element body 10 receives an impact, the impact can be mitigated.

The present disclosure is not limited to the embodiments described above and may be changed in design without departing from the spirit of the present disclosure. For example, respective feature points of the first to third embodiments may variously be combined.

In the embodiments, the axis of the coil is orthogonal to the side surface of the element body; however, the axis may be orthogonal to the end surface of the element body or may be orthogonal to the bottom surface of the element body.

In the embodiments, the first and second external electrodes are L-shaped; however, the external electrodes may be five-sided electrodes, for example. Therefore, the first external electrode may be disposed on the entire first end surface and a portion of each of the first side surface, the second side surface, the bottom surface, and the top surface, and the second external electrode may be disposed on the entire second end surface and a portion of each of the first side surface, the second side surface, the bottom surface, and the top surface. In this case, as a modification of the second embodiment, the void exists in a region where the coil wiring and the external electrode overlap when viewed in a direction orthogonal to at least one surface of the multiple surfaces of the element body disposed with the external electrodes. Alternatively, the first external electrode and the second external electrode may each be disposed on a portion of the bottom surface.

EXAMPLE

An example of a method of manufacturing the inductor component will hereinafter be described.

First, an insulating layer is formed by repeatedly applying an insulating paste mainly composed of borosilicate glass onto a base material such as a carrier film by screen printing. This insulating layer serves as an outer-layer insulating layer located outside coil conductor layers. The base material is peeled off from the insulating layer at an arbitrary step and does not remain in the inductor component state.

Subsequently, a photosensitive conductive paste layer is applied and formed on the insulating layer to form a coil conductor layer and an external electrode conductor layer by a photolithography step. Specifically, the photosensitive conductive paste containing Ag as a main metal component is applied onto the insulating layer by screen printing to form the photosensitive conductive paste layer. Ultraviolet rays etc. are then applied through a photomask to the photosensitive conductive paste layer and followed by development with an alkaline solution etc. As a result, the coil conductor layer and the external electrode conductor layer are formed on the insulating layer. At this step, the coil conductor layer and the external electrode conductor layer can be drawn into a desired pattern with the photomask.

A photosensitive insulating paste layer is applied and formed on the insulating layer to form an insulating layer provided with an opening and a via hole by a photolithography step. Specifically, a photosensitive insulating paste is applied onto the insulating layer by screen printing to form the photosensitive insulating paste layer. Ultraviolet rays etc. are then applied through a photomask to the photosensitive insulating paste layer and followed by development with an alkaline solution etc. At this step, the photosensitive insulating paste layer is patterned so as to dispose the opening above the external electrode conductor layer and the via hole at an end portion of the coil conductor layer with the photomask.

Subsequently, a photosensitive conductive paste layer is applied and formed on the insulating layer provided with the opening and the via hole to form a coil conductor layer and an electrode conductor layer by a photolithography step. Specifically, a photosensitive conductive paste containing Ag as a main metal component is applied onto the insulating layer so as to fill the opening and the via hole by screen printing to form the photosensitive conductive paste layer. Ultraviolet rays etc. are then applied through a photomask to the photosensitive conductive paste layer and followed by development with an alkaline solution etc. This leads to the formation of the external electrode conductor layer connected through the opening to the external electrode conductor layer on the lower layer side and the coil conductor layer connected through the via hole to the coil conductor layer on the lower layer side. For example, by using a photosensitive conductive paste to which a compound decomposing at a desired firing temperature is added, voids can be formed in the element body during firing.

The steps of forming the insulating layer as well as the coil conductor layer and the external electrode conductor layer as described above are repeated to form a coil made up of the coil conductor layers formed on the multiple insulating layers and external electrodes made up of the electrode conductor layers formed on the multiple insulating layers. An insulating layer is further formed by repeatedly applying an insulating paste by screen printing onto the insulating layer with the coil and the external electrodes formed. This insulating layer serves as an outer-layer insulating layer located outside the coil conductor layers. If sets of coils and external electrodes are formed in a matrix shape on the insulating layers at the steps described above, a mother laminated body can be acquired.

Subsequently, the mother laminated body is cut into multiple unfired laminated bodies by dicing etc. At the step of cutting the mother laminated body, the external electrodes are exposed from the mother laminated body on a cut surface formed by cutting. In this case, if a cut deviation occurs in a certain amount or more, the outer circumferential edge of the coil conductor layer formed in the step appears on the end surface or the bottom surface.

The unfired laminated bodies are fired under predetermined conditions to acquire element bodies including the coils and the external electrodes. The voids can be formed by firing in the element body around the coil. These element bodies are subjected to barrel finishing for polishing into an appropriate outer shape size, and portions of the external electrodes exposed from the laminated bodies are subjected to Ni plating having a thickness of 2 μm to 10 μm and Sn plating having a thickness of 2 μm to 10 μm. Through the steps described above, inductor components of 0.4 mm×0.2 mm×0.2 mm to 0.3 mm are completed.

The construction method of forming the conductor pattern is not limited to the above method and may be, for example, a printing lamination construction method of a conductive paste using a screen printing plate opened in a conductor pattern shape, may be a method using etching for forming a pattern of a conductive film formed by a sputtering method, a vapor deposition method, pressure bonding of a foil, etc., or may be a method in which formation of a negative pattern is followed by formation of a conductor pattern with a plating film and subsequent removal of unnecessary portions as in a semi-additive method. Furthermore, by forming the conductor pattern in multiple stages to achieve a high aspect ratio, a loss due to resistance at high frequency can be reduced. More specifically, this may be a process of repeating the formation of the conductor pattern, may be a process of repeatedly laminating wirings formed by a semi-additive process, may be a process of forming a portion of lamination by a semi-additive process and forming the other portion by etching from a film grown by plating, or may be implemented by combining a process in which a wiring formed by a semi-additive process is further grown by plating to achieve a higher aspect ratio.

The conductive material is not limited to the Ag paste as described above and may be a good conductor such as Ag, Cu, and Au formed by a sputtering method, a vapor deposition method, pressure bonding of a foil, plating, etc. The method of forming the insulating layers as well as the openings and the via holes is not limited to the above method and may be a method in which after pressure bonding, spin coating, or spray application of an insulating material sheet, the sheet is opened by laser or drilling.

The insulating material is not limited to the grass and ceramic materials as described above and may be an organic material such as an epoxy resin, a fluororesin, and a polymer resin, or may be a composite material such as a glass epoxy resin although a material low in dielectric constant and dielectric loss is desirable.

The size of the inductor component is not limited to the above description. The method of forming the external electrodes is not limited to the method of applying plating to the electrode conductor exposed by cutting and may be a method including further forming conductor electrodes by dipping of a conductor paste, a sputtering method, etc. after cutting and then applying plating thereto.

What is claimed is:

1. An inductor component comprising:
   an element body; and
   a coil disposed in the element body and wound along an axial direction, wherein
   the element body includes a void, and
   the void exists at least within 10 μm from the coil, wherein
   the coil has a plurality of coil wirings wound along a plane orthogonal to the axial direction, the plurality of the coil wirings being arranged side by side in the axial direction and electrically connected to each other,
   the void exists at least in a region between the coil wirings adjacent to each other in the axial direction, and
   in a cross section including an axis of the coil, a first area ratio of an area of the voids in a region between the coil wirings adjacent to each other in the axial direction in all the coil wirings to an area of the element body is larger than a second area ratio of an area of the voids in a region on the axis side of the coil relative to an inner circumferential surface of the coil to the area of the element body.

2. The inductor component according to claim 1, wherein a size of the void in the axial direction is from 0.1 μm to 20 μm.

3. The inductor component according to claim 1, wherein a size of the void in the axial direction is from 0.1 μm to 10 μm.

4. The inductor component according to claim 1, wherein
the void is one of a plurality of voids, and
the plurality of voids is separated from each other at a distance of 0.1 μm or more.

5. The inductor component according to claim 1, wherein
the first area ratio is from 5/95 to 50/50, and
the second area ratio is from 0 to 1/99.

6. The inductor component according to claim 1, further comprising:
an external electrode exposed from the surface of the element body, wherein
the external electrode is electrically connected to the coil,
the coil includes a plurality of coil wirings wound along the plane orthogonal to the axial direction,
the plurality of the coil wirings is arranged side by side in the axial direction and are electrically connected to each other, and
the void exists at least in a region where the coil wiring and the external electrode overlap when viewed in a direction orthogonal to the surface of the element body provided with the external electrode.

7. The inductor component according to claim 6, wherein
in a cross section parallel to the axis of the coil and orthogonal to the surface of the element body disposed with the external electrode, a third area ratio of an area of the voids in a region where the coil wiring and the external electrode overlap when viewed in a direction orthogonal to the surface of the element body to the area of the element body is larger than the second area ratio of the area of the voids in the region on the axis side of the coil relative to the inner circumferential surface of the coil to the area of the element body.

8. The inductor component according to claim 7, wherein
the third area ratio is from 5/95 to 50/50, and
the second area ratio is from 0 to 1/99.

9. The inductor component according to claim 1, wherein
the void exists at least in a region on a side opposite to the axis of the coil relative to an outer circumferential surface of the coil.

10. The inductor component according to claim 9, wherein
in the cross section including the axis of the coil, a fourth area ratio of an area of the voids in a region on the side opposite to the axis of the coil relative to the outer circumferential surface of the coil to the area of an element body is larger than the second area ratio of the area of the voids in the region on the axis side of the coil relative to the inner circumferential surface of the coil to the area of the element body.

11. The inductor component according to claim 1, wherein
a relative permittivity of the element body is from 2.0 to 8.0.

12. The inductor component according to claim 1, wherein
the coil is exposed to the void.

13. The inductor component according to claim 2, wherein
the void is one of a plurality of voids, and
the plurality of voids is separated from each other at a distance of 0.1 μm or more.

14. The inductor component according to claim 2, wherein
the coil has a plurality of coil wirings wound along the plane orthogonal to the axial direction, the plurality of the coil wirings being arranged side by side in the axial direction and electrically connected to each other, and
the void exists at least in a region between the coil wirings adjacent to each other in the axial direction.

15. The inductor component according to claim 2, further comprising:
an external electrode exposed from the surface of the element body, wherein
the external electrode is electrically connected to the coil,
the coil includes a plurality of coil wirings wound along the plane orthogonal to the axial direction,
the plurality of the coil wirings is arranged side by side in the axial direction and are electrically connected to each other, and
the void exists at least in a region where the coil wiring and the external electrode overlap when viewed in a direction orthogonal to the surface of the element body provided with the external electrode.

16. The inductor component according to claim 2, wherein
the void exists at least in a region on a side opposite to the axis of the coil relative to an outer circumferential surface of the coil.

17. The inductor component according to claim 2, wherein
a relative permittivity of the element body is from 2.0 to 8.0.

18. The inductor component according to claim 2, wherein
the coil is exposed to the void.

* * * * *